June 1, 1937.
A. R. SMITH
2,082,555
PROCESS FOR DRYING FISH SCRAP
Filed Jan. 17, 1936
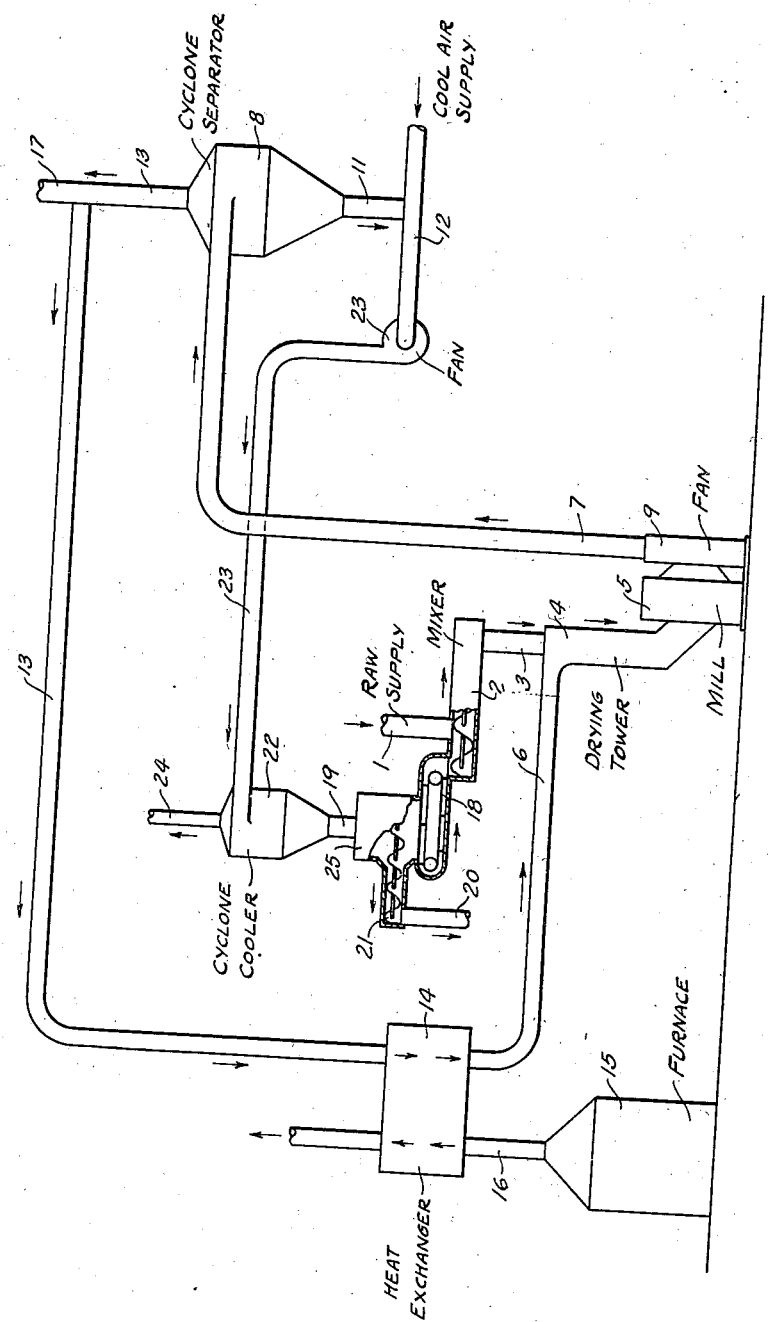
INVENTOR
ALFRED R. SMITH.
BY
ATTORNEY Patented June 1, 1937

2,082,555

UNITED STATES PATENT OFFICE 2,082,555

PROCESS FOR DRYING FISH SCRAP

Alfred R. Smith, Forest Hills, N. Y., assignor to Combustion Engineering Company, Inc., New York, N. Y.

Application January 17, 1936, Serial No. 59,575

3 Claims. (Cl. 34—24)

The present invention relates to the treatment of fish scrap and the preparation of fish meal from such scrap. It proposes to use in such treatment a process used heretofore for drying and grinding wet materials, but to modify it in order to overcome some difficulties which, without such modifications, would render such prior process useless for the present purpose.

The purpose of the present invention may therefore be stated to be to modify and adapt such prior process so as to remove certain difficulties encountered when the process is applied to materials such as those referred to. In describing the invention reference will be made to the drawing filed herewith showing in a single figure and more or less diagrammatically and partly in section a system utilizing the improvement.

In this type of process the material to be treated is dried and comminuted in a combined drying tower and mill. The drying is accomplished by means of a hot current of air which also serves to convey the material through the tower and mill and thence to a separator. Some materials treated in such systems heretofore and coming to the apparatus in very wet state have presented difficulties in connection with their being fed to the drying tower. They cannot be moved along in the feeding device in their raw wet state but will merely clog up such device. Under the prior practice a certain amount of the dried finished product is returned and intimately mixed with the raw wet supply for the purpose of putting the material in such a physical condition that the feeding device can properly move it along.

Fish scrap, such as the present invention is concerned with, does not necessarily present this difficulty but could be carried along by the feeding device without being mixed with any dry finished product. It has been found, however, that when the fish scrap is exposed to the current of hot gases in the drying tower and mill, fish glue is formed and comes to the surface of the particles of scrap causing such particles either to adhere to the sides and bottom of the drying tower and the surfaces in the mill or to deposit glue on these various surfaces. In either case the resulting deposits will harden and are extremely difficult to remove and such removal necessitates the shutting down of the plant. By the present invention this difficulty is obviated.

In the drawing the fresh raw supply is brought to the system through the connection 1 and is delivered by it to the mixer-conveyor 2 which delivers it through the pipe 3 to the tower 4 and mill 5. In the tower it meets a hot current of gases, coming in through the pipe 6, which carries the scrap particles through a tower and mill and through the pipe 7 to the cyclone separator 8. The current of hot gases is induced by the fan 9 which is conveniently combined with the mill 5.

In the cyclone separator the dried material is separated from the gases and delivered by means of the pipe 11 to the pipe 12. The gases leave the separator by means of the pipe 13 by which they are delivered to the reheater 14, leaving it by pipe 6 to return to the drying tower. In the reheater 14 the gases are reheated by means of hot products of combustion delivered from the furnace 15 through the pipe 16.

A vent 17 is provided at some point in this gas circuit to permit excess gas to escape to the atmosphere.

In order to prevent the glue which forms and comes to the surface of the scrap particles in the drying tower and mill from causing the glue or the material or both to stick to the surfaces I use means such as those used heretofore for another purpose, namely for placing the wet raw material into proper condition for manipulation in the feeding device; i. e. I return a certain proportion of the finished dried product and mix it with the raw scrap. The amount I use for this purpose is such that the surface of each particle of the scrap is completely covered with previously dried material when such scrap particles are delivered into the drying tower, the quantity used being such that the glue as it is liberated is absorbed by the dry material and does not wet the exposed surface of such dry material. The object and action of such dry return is therefore quite different from that of the dry return in the prior art. In the present case the action of such dry return occurs in the drying tower and mill and not in the mixer, as the glue has not formed in the mixer but is liberated only when the heat in the drying tower acts on the scrap. Moreover the quantity may be quite different from that required for the purpose of the prior art, and is regulated in response to a different factor.

The dry return is delivered to the mixer-conveyor by the belt-conveyor 18 which receives it from the bin 25 through the pipe 19. The part of the finished product which is to be removed from the system is taken off bin 25 through pipe 20 to which it is delivered by the conveyor 21.

I have found that if this dry return is taken directly to bin 25 from pipe 11 another serious difficulty develops. This dry material from pipe 11 is of such temperature that when it is mixed in the required ratio with the raw supply, glue will be liberated at this stage and the conveyor-mixer will very quickly become clogged. I therefore introduce a cooling means to reduce the temperature of such finished product before delivering it to bin 25 and conveyor-mixer 2. A supply of cool air is used for this purpose to convey material from pipe 11 to a cooling cyclone separator 22. This current of cool air is induced by means such as the fan 23. In cooling the separator the air is separated and leaves by means of the pipe 24, whereas the solids fall through pipe 19 into bin 25. By so first cooling the dried material all difficulty in the mixer-conveyor is avoided.

While in the above I have described the invention as applied specifically to fish scrap and the preparation therefrom of fish meal, I wish it understood that this is meant to be illustrative and not limiting. The invention is evidently applicable to any material exuding glue under the conditions referred to, and the claims are intended to have such ambit as to include all such materials.

What I claim is:

1. The process of drying fish meal and similar products consisting of discrete particles which on being heated liberate glue, comprising the steps of coating the particles of the fresh material with some previously dried material, suspending the particles so coated in a current of hot gases whereby they are dried and glue liberated is absorbed by the coating, the amount of said coating being such that the glue is absorbed by the coating without reaching its surface, separating the particles so dried from the hot gases, cooling the dried material, using a part of the cooled dried material for coating the particles of fresh material, and removing the rest of the cooled dried material.

2. The process according to claim 1, the cooling being done by conveying the dried material by means of a current of cool gas, the process comprising further the step of separating the material from the cool gas.

3. The process of drying fish meal and similar products consisting of discrete particles which on being heated liberate glue, comprising the steps of coating the particles of the fresh material with some previously dried material, suspending the particles so coated in a current of hot gases whereby they are dried and glue liberated is absorbed by the coating, the amount of said coating being such that the glue is absorbed by the coating without reaching its surface, and separating the particles so dried from the hot gases.

ALFRED R. SMITH.